United States Patent
Jiang et al.

(10) Patent No.: US 7,006,728 B1
(45) Date of Patent: Feb. 28, 2006

(54) ADD/DROP MODULE USING TWO FULL-BALL LENSES

(75) Inventors: Wei Jiang, Austin, TX (US); Yingzhi Sun, London (CA); Ray T. Chen, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 10 days.

(21) Appl. No.: 10/602,121

(22) Filed: Jun. 23, 2003

Related U.S. Application Data

(60) Provisional application No. 60/391,308, filed on Jun. 24, 2002.

(51) Int. Cl.
*G02B 6/32* (2006.01)
*G02B 6/38* (2006.01)

(52) U.S. Cl. .............................. 385/35; 385/61; 385/74; 385/79

(58) Field of Classification Search .................. 385/33, 385/35, 61, 74, 79, 93
See application file for complete search history.

(56) References Cited

U.S. PATENT DOCUMENTS

| | | | | |
|---|---|---|---|---|
| 4,290,667 | A | * | 9/1981 | Chown ........................ 385/33 |
| 6,332,051 | B1 | * | 12/2001 | Ai et al. ....................... 385/33 |
| 6,767,139 | B1 | * | 7/2004 | Brun et al. ................... 385/84 |
| 6,894,846 | B1 | * | 5/2005 | He et al. ..................... 359/722 |
| 2002/0191294 | A1 | * | 12/2002 | Duggan ....................... 359/578 |
| 2003/0174937 | A1 | * | 9/2003 | Huang et al. ................. 385/24 |

* cited by examiner

*Primary Examiner*—John D. Lee
(74) *Attorney, Agent, or Firm*—Workman Nydegger

(57) ABSTRACT

An optical device has a housing for receiving a plurality of optical fibers adapted to carry optical signals. A filter is disposed within the housing for transmitting specific optical signals having a predetermined wavelength range. A first ball lens is coupled to the housing and is positioned relative to the filter and the optical fibers to selectively collimate and focus the optical signals. A second ball lens is coupled to the housing and is also positioned relative to the filter and optical fibers to selectively collimate and focus the optical signals. Both ball lenses are optically coupled to the filter.

23 Claims, 4 Drawing Sheets

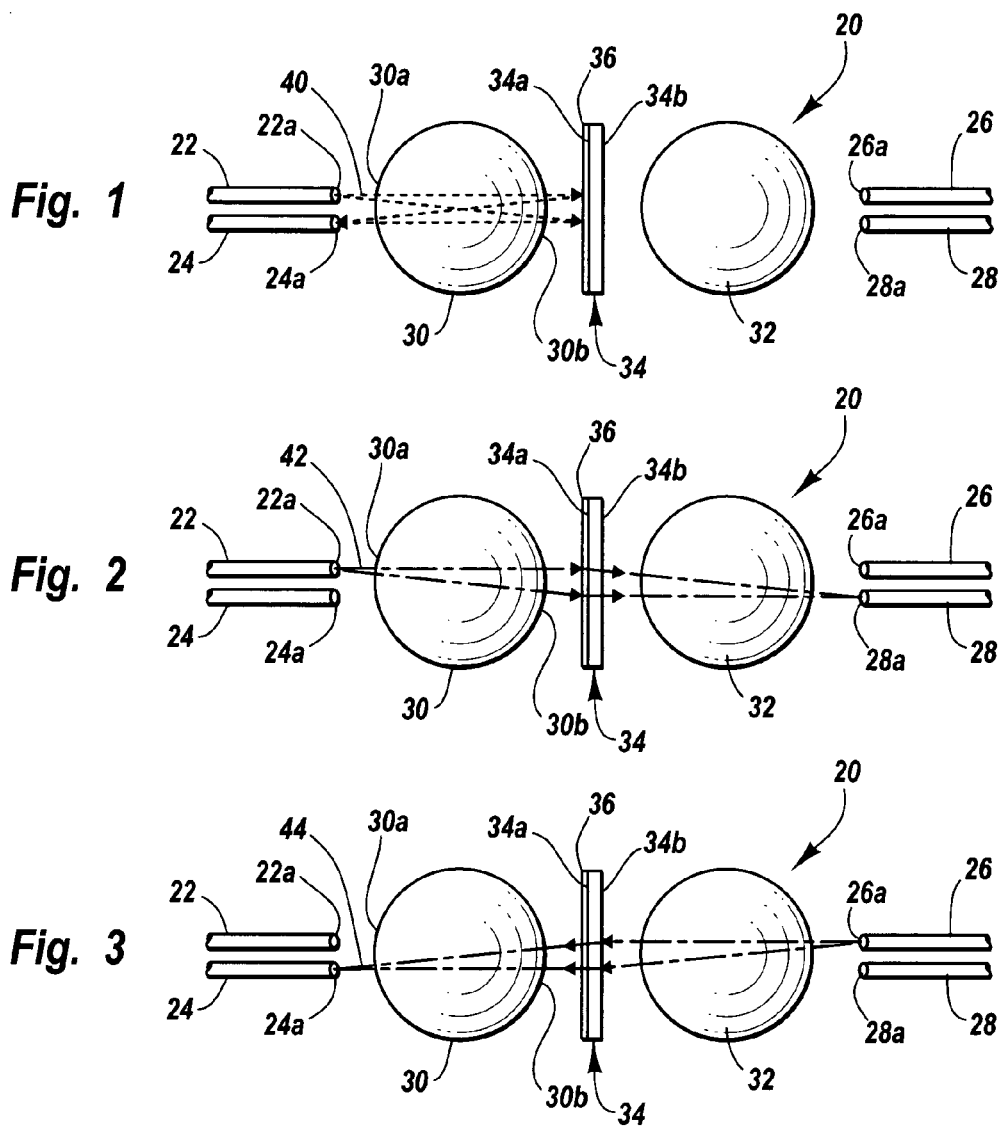
Fig. 1
Fig. 2
Fig. 3
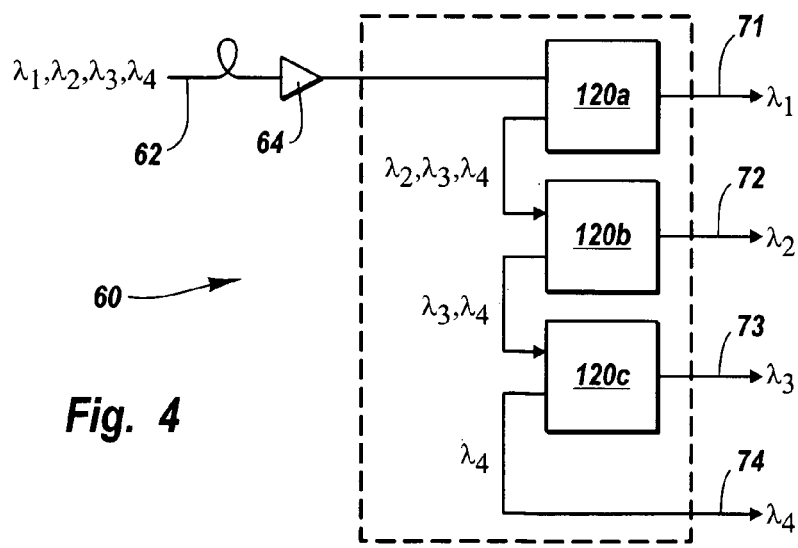
Fig. 4

ADD/DROP MODULE USING TWO FULL-BALL LENSES

CROSS-REFERENCE TO RELATED APPLICATIONS

This application claims priority to and the benefit of U.S. Provisional Patent Application No. 60/391,308, filed on Jun. 24, 2002, entitled Add/Drop Module Using Two Full-Ball Lenses, which is incorporated herein by reference in its entirety.

BACKGROUND OF THE INVENTION

1. The Field of the Invention

The present invention relates to optical devices usable within an optical network. More particularly, the present invention relates to using full-ball lenses in an add/drop module of an optical device.

2. Background of the Invention

Optical add/drop modules are commonly used in existing optical communications networks. These add/drop modules may include add/drop multiplexers (OADM), add/drop de-multiplexers (OADDM), and other types of add/drop optical components. A multiplexer enables multiple carrier waves to be carried on a single transmission medium by combining the multiple carrier waves into a single carrier wave that propagates along the optical fiber.

The multiple carrier waves are at different frequencies and separated by some predetermined amount of frequency separation. This frequency separation is known as the channel spacing. Combining the multiple signals into a single carrier signal reduces the number of fiber cables that must be laid in order to transmit a required amount of data. Depending on the type of cable and the number of individual channels combined into the cable, a significant increase in overall data transmission rates may be achieved using OADMs.

At a location remote from the OADM is an optical add/drop de-multiplexer (OADDM) that separates the different wavelengths from the multiplexed carrier signals and transmits each of these wavelengths to their own individual receivers. Alternately, the OADDM might drop one or more single channels from the propagating signal. The data on these channels is received by a receiver specifically tuned to the frequency of that channel and which performs the optical to electrical conversions accordingly. The remaining channels are forwarded to the next node without being routed through a receiver. The use of OADMs and OADDMs in optical networks has increased significantly over the last few years, particularly as the channel spacing has been reduced from about 200 GHz for Dense Wavelength Division Multiplexing (DWDM) systems to about 25 GHz for Ultra-Dense Wavelength Division Multiplexing (UDWDM) systems.

Typically, one or more graded or gradient index (GRIN) lenses are used in optical communications equipment and imaging systems, such as optical add/drop multiplexers and de-multiplexers. Rods or optical fibers, and even a relatively flat piece of optical material, may function as a GRIN lens. Unfortunately, relatively precise and sometimes tedious alignment procedures are often required during fabrication and assembly of optical communications equipment using GRIN lenses. Also, the cost of optical communications equipment having one or more GRIN lenses may be high due to the requirement for the use of high precision mechanical parts to maintain desired optical alignment.

In addition to the cost aspects of using GRIN lenses, issues arise from the large beam diameter associated with the GRIN lens. Specifically, currently available GRIN lenses that have a relatively large beam diameter may conflict with aperture requirements and stability requirements of associated optical mechanical components.

In an attempt to alleviate the problems associated with GRIN lenses, optical add/drop modules have previously been manufactured using two half-ball lenses with a beam splitting filter disposed between the half-ball lenses. Unfortunately, this approach is as problematic as using a GRIN lens. For instance, cutting a full-ball lens and polishing the resulting half ball lenses can be expensive. Additionally, aligning the half ball lenses within an optical component can be both expensive and time consuming due to the precise alignment procedures required for packaging discrete optical components.

SUMMARY OF THE INVENTION

In accordance with teachings of the present invention, a pair of full-ball lenses and a filter may be used to manufacture an optical add/drop module and other optical communications devices and imaging systems. In this configuration, the present invention overcomes the limitations and problems described with respect to the use of GRIN lenses and half-ball lenses.

The present invention reduces the requirements for special-polishing of fiber interfaces in an optical module or other optical communications device through use of a pair of full-ball lenses and associated filter. Further, use of a pair of full-ball lenses reduces optical aberrations associated with GRIN lenses and half-ball lenses. Additionally, mechanical components associated with positioning and alignment of a pair of full-ball lenses formed in accordance with teachings of the present invention generally are less complicated and expensive than existing mechanical components associated with current optical communications devices.

An optical module formed in accordance with the teachings of the present invention may satisfy standard back reflection requirements for optical network components without adding costs to the associated system. An optical module formed with a pair of full-ball lenses in accordance with teachings of the present invention may include a relatively small beam diameter through the lenses, which is compatible with the aperture and numerical aperture requirements of other components.

Another aspect of the present invention further includes a significant reduction a of geometrical spot size and insertion loss. The present invention allows simplification of optical mechanical design and packaging of a resulting optical communications device. For some applications, an optical module may be produced using a pair of full-ball lenses in accordance with teachings of the present invention at a substantially reduced cost as compared to using GRIN lenses or two half ball lenses to produce an optical module with the same optical communications capabilities. For some applications, the cost of obtaining a ball lens which has been fully coated with antireflective material may be substantially less than the cost of a GRIN lens with the same optical characteristics.

These and other objects and features of the present invention will become more fully apparent from the following description and appended claims, or may be learned by the practice of the invention as set forth hereinafter.

BRIEF DESCRIPTION OF THE DRAWINGS

A more complete and thorough understanding of the present invention and advantages thereof may be acquired by referring to the following description taken in conjunction with the accompanying drawings, in which like reference numbers indicate like features, and wherein:

FIG. 1 is a schematic drawing showing an optical add/drop module according to one aspect of the present invention;

FIG. 2 is a schematic drawing showing the OADM of FIG. 1 communicating a selected wavelength optical signal from the input port to a drop port;

FIG. 3 is a schematic drawing showing the OADM of FIG. 1 communicating a selected wavelength optical signal from an add port to the output port;

FIG. 4 is a schematic drawing of an OADDM formed in accordance with another aspect of the present invention;

DETAILED DESCRIPTION OF THE INVENTION

Figure 5:
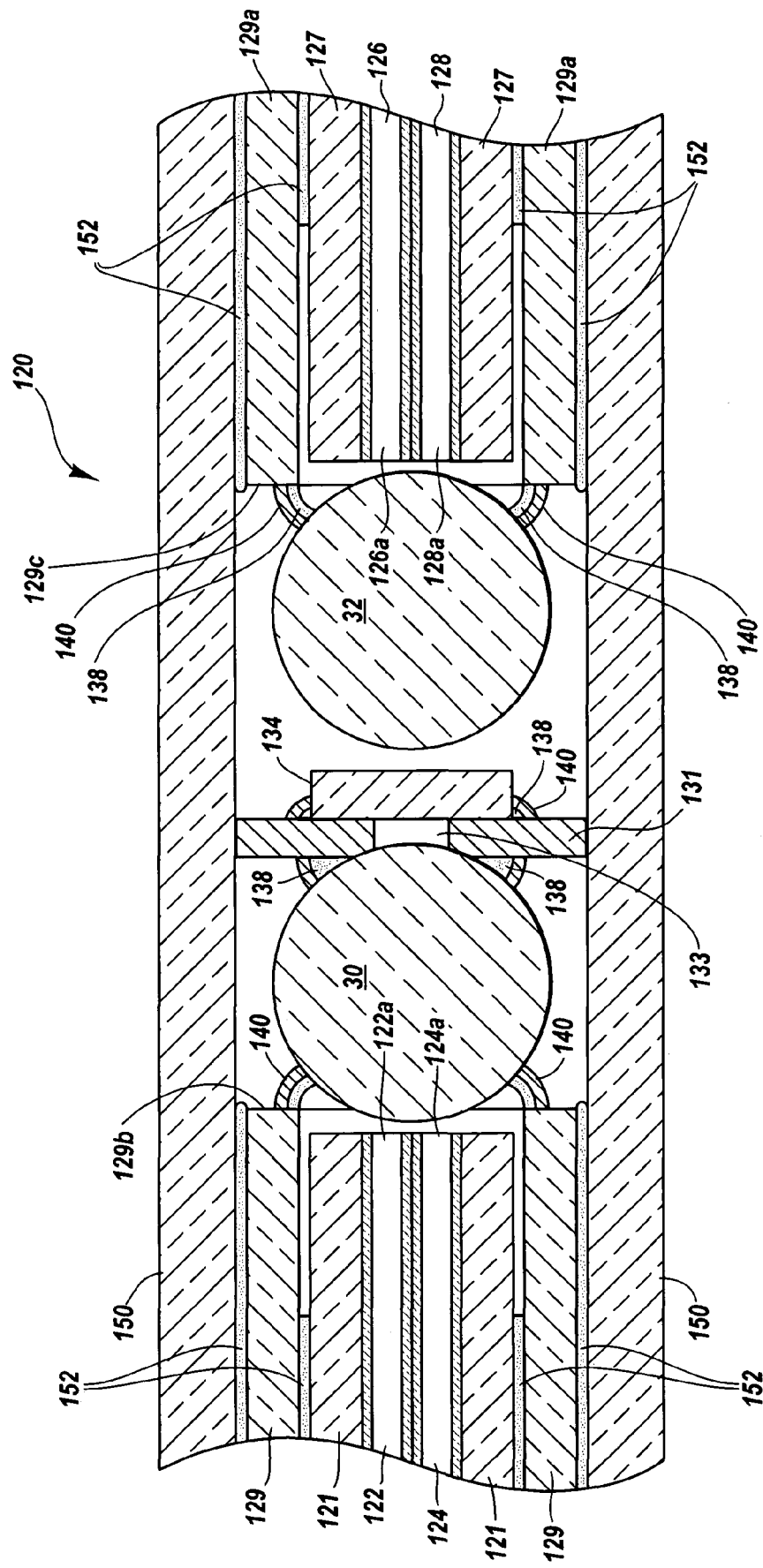
FIG. 5 is a sectional drawing of an OADM having a pair of full-ball lenses and a filter according to an alternate aspect of the present invention.

Reference will now be made to FIGS. 1–8 to describe exemplary embodiments and configurations of an add/drop module in accordance with the invention. It is to be understood that the drawings are diagrammatic and schematic representations of exemplary embodiments, and are not limiting of the present invention, nor are they necessarily drawn to scale.

The add/drop module generally includes a pair of ball lenses to direct the electromagnetic radiation propagating through the add/drop module. By using a pair of ball lenses, the present invention reduces the requirements for special-polishing of fiber interfaces in an optical module or other optical communications device, reduces optical aberrations associated with the optical module, and reduces geometrical spot size and insertion loss while reducing the complexity of the mechanical components used to position and align a pair of half ball lenses. As used herein, the term "optical signal" includes the full range of all electromagnetic waves which may be satisfactorily used to communicate information through waveguides and/or fiber optic cables.

FIGS. 1, 2 and 3 schematically depict one exemplary embodiment of an optical add/drop multiplexer (OADM) 20 of the present invention. With reference to FIG. 1, OADM 20 includes a first full-ball lens 30 separated from a second full-ball lens 32 by a thin-film filter 34. The combination of ball lenses 30 and 32 with filter 34 may be termed an optical assembly. This optical assembly is disposed between an input port 22, an output port 24, an add port 26, and a drop port 28. Various types of optical a fibers and/or waveguides may be satisfactorily used as input port 22, output port 24, add port 26, and drop port 28. In one aspect of the present invention, standard single mode fibers such as Owens Corning SMF-28 may be used to provide ports 22, 24, 26 and 28. Although reference is made to a specific optical fiber, one skilled in the art will understand that any optical fiber or other waveguide may be used to function as a port in accordance with the teaching of the present invention.

Each full-ball lens 30 and 32 has a generally spherical configuration. Full-ball lenses are easier to handle than half ball lenses that are currently used in WDMs or WDDMs. The use of a full-ball lens overcomes many problems with existing optical systems that use a half-ball lens. Unlike a half ball lens, a full-ball lens does not have a planar surface. Therefore, a full-ball lens may be placed in any orientation with respect to an associated planar filter, or more appropriately, orientation is isotropic to ball lenses of a full-ball system formed in accordance with teachings of the present invention. A pair of full-ball lenses eliminates four angular tolerances without introducing other tolerances. For instance, the two surface tilt tolerances for each half-ball's planar surface are eliminated. Hence, the present invention saves the cost of making two high precision parts and reduces labor costs of manual alignment of the lenses.

The full-ball lenses 30 and 32 may collimate optical signals incident thereupon. For instance, lens 30 collimates optical signals received from port 22 and directs the optical signals on a central portion of optical filter 34. The first ball lens 30 also focuses optical signals reflected from or passing through optical filter 34 into output port 24, as shown in FIG. 3. Similarly, second ball lens 32 focuses optical signals passing through optical filter 34 into drop port 28, while collimating optical signals exiting from add port 26 and directing the optical signals from add port 26 through the central portion of optical filter 34.

Using full-ball lenses 30 and 32 aids with reducing the overall length needed for the optical assembly. Specifically, the paraxial object focal length of a full-ball lens is considerably smaller than that of a half-ball lens. Focal length (f) is generally defined as the distance from an on-axis object to the first spherical surface. The formulae for two cases are given below, the first for a half ball lens and the second for a full-ball lens.

$$f=(1/(n-1))R \qquad (1)$$

$$f=[(2-n)/2]*[1/(n-1)]R \qquad (2)$$

where n is the index of refraction of the ball material and R is the radius. For BK7 glass (n=1.52), for instance, it gives a reduction of focal length by 4.1, for SF2 glass (n=1.65), a reduction by 5.7, regardless of the value of R.

In addition to reducing the focal length of the lenses over a half-ball lens configuration, a reduction in the beam size on the lens surface is also achieved. Because the beam size on the lens surface is linearly dependent on the focal lengths for the same object numerical aperture (NA), there is a resultant reduction in the beam size on the first spherical surface of the full-ball lens. Since most problematic aberrations, such as third aberrations that are dominant in the half-ball or full-ball lenses, are proportional to the square of the beam size, using the configuration of the present invention results in a large reduction in the aberration.

Typical spot or beam sizes are around 0.87 $\mu$m for a point source with NA=0.14 and losses of less than 1.4 dB as predicted by computer simulation for an SF2 full-ball lens with a diameter of 3.4 mm. It will be understood that the beam sizes, NA, losses, and diameter of the full-lenses may be varied as desired depending upon the configuration of the present invention. Specific dimensions of the device will depend on the types of materials used and the wavelength of light for which the device is designed. Generally, it is understood that use of a pair of full-ball lenses instead of GRIN lenses or half-ball lenses solves the problems discussed herein.

Since the beam size influences the size of other associated opto-mechanical parts of the system, the smaller beam size associated with a full-ball lens also facilitates reducing the inner diameter of any associated opto-mechanical parts. Since the internal parts may be made smaller, this allows for an increase in the thickness of the walls of the housing surrounding the opto-mechanical parts so as to maintain an overall package of approximately the same size. This adds to the overall strength of the package and helps to decrease the potential breakage of mechanical parts that are relatively small as used in an optical module.

The diameter of ball lenses 30 and 32 is selected based on the type of material used to form each ball lens and associated design requirements for OADM 20. For instance, each ball lens can be selected based upon the desired coupling efficiency, lens radius, lens refractive index, magnification in imaging the laser diode on the fiber, defocus to counterbalance spherical aberration of the lens, effective numerical apertures, wavelength, and other design requirements known to one skilled in the art. Regardless of the material used, a full ball lens can shorten the focal length by approximately half over the use of half ball lenses, thus reducing the overall size of the package containing the components.

Selected portions of the exterior surface of each ball lens 30 and 32 through a which light signals pass may be coated with any one of a variety of anti-reflective films or coatings known to those skilled in the art. For other applications, substantially all of the exterior surface of each ball lens 30, 32 may be coated with anti-reflective material. In either case, the anti-reflective film or coating may be single or multi-layer dielectrics, or other coatings that aid the transmission of electromagnetic radiation through the ball lens. Examples of particular coatings include, but are not limited to $SiO_2/Si_2H_3$, and $SiO_2/TiO_2$ Generally, full-ball lenses 30 and 32 may be formed from a wide variety of materials. For instance, full-ball lenses 30 and 32 may be formed from BK7 optical glass, SF2 optical glass, SF8 optical glass, or sapphires. In a more general sense, full-ball lenses 30 and 32 may be formed from glass, crystal, sapphires, $LiNbO_3$, ZnO, semiconductors, polymers, natural materials, synthetic material, combinations thereof, or other materials that enable lenses 30 and 32 to perform the desired function of transmitting electromagnetic radiation.

As mentioned above, disposed between lenses 30 and 32 is filter 34. For some applications, optical filter 34 may have the general configuration of a disc with a diameter approximately equal to the diameter of ball lenses 30 and 32. Alternately, optical filter 34 may have a polygonal configuration. For the embodiment of the present invention as shown in FIGS. 1, 2 and 3, optical filter 34 includes a first surface 34a disposed proximate first ball lens 30 and a second surface 34b disposed proximate second ball lens 32. A layer of wavelength selective film 36 may be disposed on either first surface 34a or second surface 34b. FIG. 1 shows a ray path that corresponds with placing the layer of wavelength selective film 36 on first surface 34a.

Wavelength selective film 36 acts as a band-pass filter by allowing particular wavelengths of light to pass through, while reflecting all other wavelengths. Typical films may include a stack of thin layers of dielectrics, such as $SiO_2$, $Ta_2O_5$, $Si_3N_4$, or other amalgamates. The change in the refractive index at the interfaces between these layers partially reflects the light. By properly choosing the thickness of the layers, the reflection builds up for certain wavelengths so that a nearly 100% reflection occurs. For narrow-band band pass filters, the dielectric layer is usually arranged as pairs of dielectric materials. Each pair or group of pairs can be regarded as a cavity. Typically, such films have one to four cavities.

The layer of wavelength selective film 36 is preferably formed from material which will reflect substantially all wavelengths of light signals communicated between input port 22 and output port 24 except at least one selected wavelength $\lambda_s$. The layer of wavelength selective film 36 preferably has at least one passband centered at the selected wavelength $\lambda_s$. For some applications the passband in the layer of wavelength selective film 36 may include a range of wavelengths centered at the selected wavelength $\lambda_s$.

As shown in FIG. 1, optical signal 40, having multiple wavelengths, exiting from input port 22 passes through first ball lens 30. The optical signal 40 is incident upon first surface 34a that transmits the portion of the optical signal having wavelength $\lambda_s$, as represented by numeral 42 in FIG. 2, while reflecting all other wavelengths of the optical signal, as represented in FIG. 1. The transmitted light passes through second ball lens 32 before entering drop port 28, while the reflected light returns through first ball lens 30 to output port 24. As shown in FIG. 3, the wavelength selective film 36 will allow optical signal 44 with wavelength $\lambda_s$ to pass through optical filter 34 when optical signal 44 is input into the optical assembly from port 26 to pass through second ball lens 32 and be incident upon film 36.

With continued reference to FIG. 1, optical signal 40 will typically diverge when it exits from end 22a of input port 22 adjacent to first ball lens 30. The adjacent surface or first surface 30a of ball lens 30 will reduce the amount of divergence and deflect the center ray of optical signal 40 towards the optical axis of OADM 20. When optical signal 40 exits from the opposite surface or second surface 30b of first ball lens 30, optical signal 40 will preferably be collimated and directed toward the central portion of optical filter 34. First surface 34a coated with wavelength selective film 36 of optical filter 34 will then reflect optical signal 40 towards the adjacent second surface of first ball lens 30. The reflected optical signal 40 will converge within first ball lens 30 as it travels towards the first surface adjacent to the end 24a of output port 24. When optical signal 40 exits from the first surface of first ball lens 30, the signal will be focused into the end 24a of output port 24.

For some applications, input port 22 and output port 24 may be disposed immediately adjacent to each other, although in other configurations input port 22 and output port 24 may be disposed some distance from each other. The extreme ends 22a, 24a, 26a and 28a of the ports, sometimes referred to as the fiber end faces, may be polished at a selected angle and may be coated with anti-reflective film to reduce back reflection. Additionally, ports 22, 24, 26 and 28 may be tilted with respect to the longitudinal axis of OADM 20 to compensate for the bending of the light rays by the angled end faces. In one embodiment, this angle may be approximately plus or minus 8° from normal relative to the longitudinal axis of the optical fiber. In an alternate embodiment, the angle of the end faces may be from about 2° to about 6°. The exact value of the optimal angle depends on the tolerance of the other mechanical parts included in OADM 20. This angle may be calculated when performing an actual alignment of the fabricated parts. It is understood by those of skill in the art that the degree of tilt of the end faces depends on the angle of the polished end faces.

A typical signal path for dropping an optical signal having wavelength $\lambda_s$ is shown in FIG. 2. For this embodiment of the present invention, optical signal 40 having wavelength $\lambda_s$ is shown exiting from input port 22 and directed by first ball lens 30 to the central portion of optical filter 34. The layer of wavelength selective film 36 allows drop signal 42 with wavelength $\lambda_s$ to pass therethrough. Second full-ball lens 32 focuses drop signal 42 into drop port 28.

A typical signal path for adding an optical signal having wavelength $\lambda_s$ is shown in FIG. 3. For this embodiment of the present invention, optical signal or add signal 44 having wavelength $\lambda_s$ is shown exiting from add port 26. Second ball lens 32 directs add signal 44 to the central portion of optical filter 34. The layer of wavelength selective film 36 disposed on first surface 34a allows add signal 44 to pass therethrough. First ball lens 30 focuses drop signal 44 into output port 24.

For purposes of illustrating various features of the present invention, the communication of optical signal 40, drop signal 42, and add signal 44 are shown in separate drawings. For many applications, optical signals may be communicated continuously from input port 22 to output port 24, while at the same time multiple add signals are communicated from add port 26 to output port 24 and multiple drop signals are communicated from input port 22 to drop port 28.

In one embodiment, the separation between ball lenses 30 and endfaces 22a, 24a, and the separation between the ball lens 30 and the filter surface 34a, is approximately equal to f of Equation (2). The separation between ball lens 32 and endfaces 26a, 28a may likewise be approximately equal to f of Equation (2). The separation between filter surface 34b and ball lens 32 may generally be any value between 0 and 0.2 mm. However, the exact values can be determined only by a detailed computer simulation of aberrations in the device given the specific materials and optical wavelength. The optical wavelength determines n in Equation (2) provided the materials are known. Also in one embodiment, the distance between fibers 22, 24 and fibers 26, 28 may be from approximately 125 μm to approximately 180 μm.

In an exemplary configuration, ball lenses 30, 32 are made from SF2 glass and have a diameter of 3.4 mm. Filter 34 has a thickness of approximately 1 mm and is approximately 1.4 mm square. It is understood by those of skill in the art that other cross sectional shapes are possible including, but not limited to, polygonal, round, oval, etc. Filter 34 may be separated by approximately 0.52 mm from ball lens 30, and by approximately 0.05 mm from ball lens 32. Both ball lenses 30, 32 may be separated from their respective fiber endfaces by approximately 0.51 mm.

In another alternate configuration, ball lenses 30, 32 are made from BK7 glass with a diameter of 2.7 mm. Filter 34 has a thickness of approximately 1 mm and is approximately 1.4 mm square. It is understood by those of skill in the art that other cross sectional shapes are possible including, but not limited to, polygonal, round, oval, etc. Filter 34 may be separated by approximately 0.67 mm from ball lens 30, and by approximately 0.12 mm from ball lens 32. Both ball lenses 30, 32 may be separated from their respective fiber endfaces by approximately 0.65 mm.

FIG. 4 is a schematic drawing showing multiple wavelength division demultiplexer (WDDM) 60 that includes a plurality of optical drop modules formed in accordance with teachings of the present invention. WDDM 60 may be described as a four channel multiple wavelength division demultiplexer. Although reference is made to a four channel multiple wavelength division demultiplexer, one skilled in the art will appreciate that a multiple wavelength division demultiplexer with any number of channels may be used or obtain a benefit from the teachings of the present invention.

The optical drop modules associated with WDDM 60 have been designated 120a, 120b and 120c. Optical drop modules 120a, 120b and 120c may have substantially the same configuration as OADM 20 except for the deletion or removal of add port 26. For other applications optical drop modules 120a, 120b and 120c may be substantially identical with OADM 20 except add port 26 is blocked or disconnected.

For the embodiment of the present invention as shown in FIG. 4, a fiber optic cable 62 is preferably coupled with an amplifier 64. An optical signal having at least four wavelengths ($\lambda_1$, $\lambda_2$, $\lambda_3$, and $\lambda_4$) is communicated from amplifier 64 to drop module 120a. The optical filter 34 associated with drop module 120a may include a passband corresponding with wavelength $\lambda_1$. Therefore, an optical signal having wavelength $\lambda_1$ will exit through fiber optic output cable 71 connected with the drop port of drop module 120a. The remaining optical signals ($\lambda_2$, $\lambda_3$, and $\lambda_4$) are then directed to drop module 120b. The optical filter 34 associated with drop module 120b may include a wavelength selective film 36 with a passband corresponding with wavelength $\lambda_2$. Therefore, optical signals having wavelength $\lambda_2$ will exit from drop module 120b through fiber optic output cable 72 connected with the associated drop port.

The remaining optical signals ($\lambda_3$ and $\lambda_4$ will be directed to drop module 120c. The optical filter 34 associated with drop module 120c may include a wavelength selective film 36 having a passband corresponding with wavelength $\lambda_3$. Therefore, optical signals having wavelength $\lambda_3$ will exit from drop module 120c through fiber optic output cable 73 connected with the associated drop port. The remaining optical signal $\lambda_4$ will exit through fiber optic cable 74 from the associated output port of drop module 120c. Additional optical drop modules 120 may be added to WDDM 60 to accommodate demultiplexing any desired number of multiple wavelength optical signals.

In a similar manner, OADM 20 and WDDM 60 may be respectively modified to function as an optical add module (not expressly shown) for use in fabricating a multiple wavelength division multiplexer (WDM) (not expressly shown). For instance, WDDM 60 may be modified such that optical cables 71–74 act as input ports that deliver optical signals having wavelengths ($\lambda_1$, $\lambda_2$, $\lambda_3$, and $\lambda_4$). Each optical cable 71–74 may include an amplifier, such as amplifier 64, while output fiber 62 may be devoid of amplifier 64.

In this illustrative configuration, module 120c, modified as an add module rather than a drop module, combines optical signals having wavelengths ?1, and X4 into an output signal that is input into modified module 120b. For instance, the optical signal having wavelength $\lambda_4$ may be input to the modified OADM through port 26 and combined with the optical signal having wavelength $\lambda_3$ input through port 22 as both optical signals are directed to port 24 as the optical signal having wavelength $\lambda_4$ passes through a filter having a $\lambda_4$ passband and the optical signal having wavelength $\lambda_3$ is reflected from the filter. Similar functions occur at modified modules 120b and 120a so that (i) module 120b combines the optical signal having wavelengths $\lambda_3$, and $\lambda_4$ with the optical signal having wavelength 2 to create an optical signal having wavelengths $\lambda_2$, $\lambda_3$, and $\lambda_4$, and (ii) module 120a combines the optical signal having wavelengths $\lambda_2$, $\lambda_3$ and $\lambda_4$ with the optical signal having wavelength $\lambda_1$ to create an optical signal having wavelengths $\lambda_1$, $\lambda_2$, $\lambda_3$, and $\lambda_4$. The final optical signal may be output along an optical fiber, such as optical fiber 62 acting as an output port.

Figure 6:
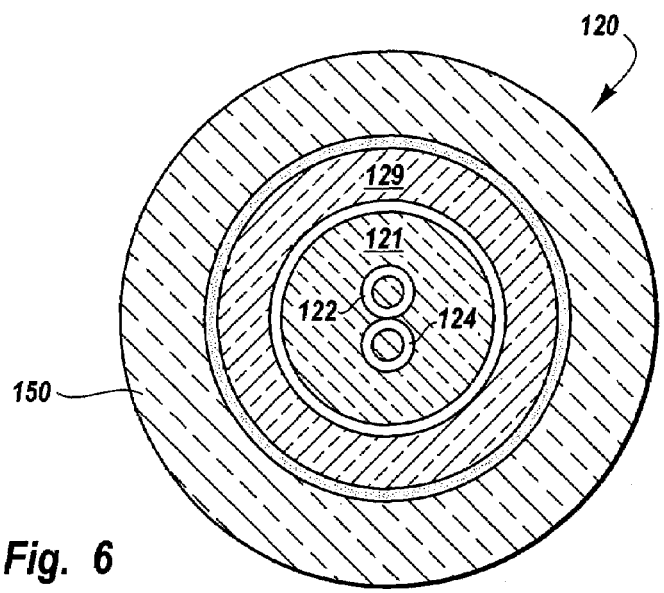
FIG. 6 is a cross sectional view of the OADM of FIG. 5 along lines 6—6 of FIG. 5.
Figure 7:
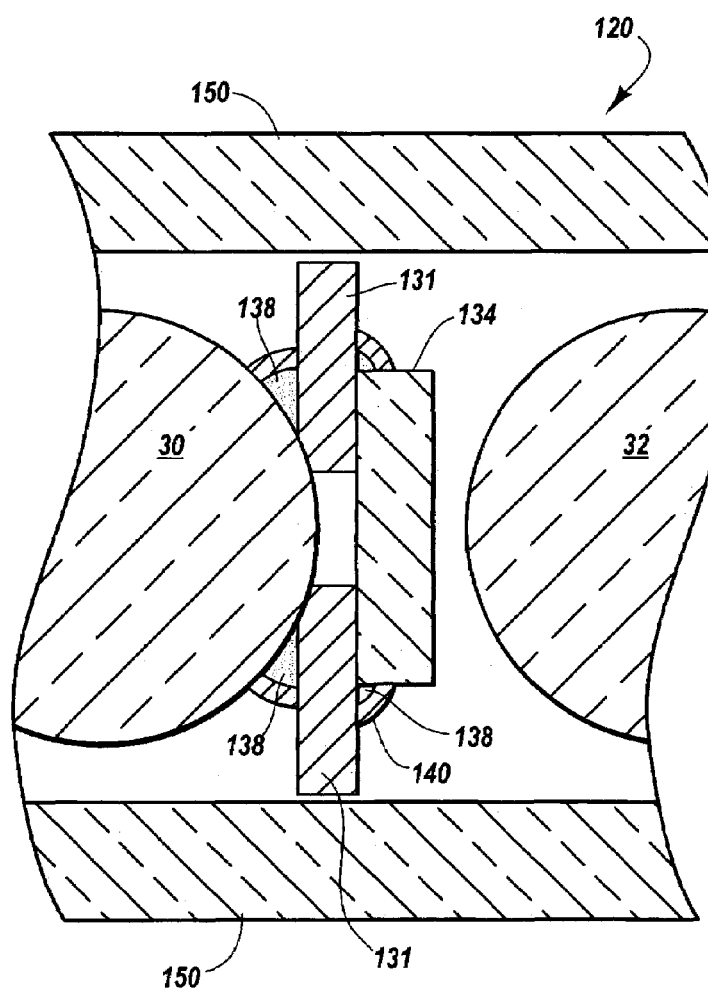
FIG. 7 is an enlarged view a portion of FIG. 5.

It is understood that the OADM of the present invention may be incorporated into various other optical modules or components, whether or not such optical components are wavelength division multiplexers and wavelength division de-multiplexers. For instance, an OADM incorporating another aspect of the present invention is depicted in FIGS. 5, 6 and 7. The OADM, identified by reference numeral 120, may be formed with some of the same optical components as previously described with respect to OADM 20.

For this illustrative embodiment of the present invention, OADM 120 includes first full-ball lens 30 attached to one side of a spacer ring or support ring 131 disposed within an interior of a housing 150. An optical filter 134 is attached to the opposite side of first support ring 131. The optical filter 134 functions as a band-pass optical filter much the same way as previously described optical filter 34. However, the configuration and dimensions associated with optical filter 134 may be substantially modified as compared to optical filter 34.

Support ring 131 includes aperture or opening 133 extending therethrough. Aperture or opening 133 receives a portion of ball lens 30 as ball lens 30 is attached to support ring 131. For instance, exterior portions of first ball lens 30 are attached to or coupled with first support ring 131 by a layer of UV cured epoxy 138 and an adjacent layer of thermally cured epoxy 140. In a similar manner a layer of UV cured epoxy 138 and a layer of thermally cured epoxy 140 is used to attach optical filter 134 to the opposite side of support ring 131.

Although reference is made to use of UV cured epoxy and thermally cured epoxy to connect or attached optical components to support ring 131, one skilled in the art will understand that various other adhesives or bonding agents may be used to connect the optical component to support ring 131. For instance, UV cured epoxy or thermally cured epoxy are not the only agents that may be used to connect the optical component to support ring 131. In another configuration, mechanical components may be used to connect the optical component to support ring 131.

OADM 120 includes an optical axis, illustrated in dotted lines, which extends through the central portion of aperture or opening 133. The various components of OADM 120 such as first full-ball lens 30, first support ring 131, optical filter 134 and second full-ball lens 32 are generally aligned with and disposed generally concentric with this optical axis. By coupling first ball lens 30 with first support ring 131 and optical filter 134 in accordance with teachings of the present invention, the relative position between these components is fixed at predetermined values. It will be understood, that another support ring may couple optical filter 134 with second full-ball lens 32.

Optical fibers 122 and 124, which correspond to respective input port 22 and output port 24 of FIG. 1, are disposed within first ferrule 121. Optical fibers 126 and 128, which correspond to respective add port 26 and drop port 28 of FIG. 1, are disposed within second ferrule 127. First ferrule 121 and second ferrule 127 may be fabricated from a wide variety of materials such as glass, crystal, metal, ceramics, semiconductors, molded plastics, synthetic materials, natural materials, combinations thereof, or other optical materials known to those skilled in the art.

Each ferrule 121 and 127 may have a single opening extending longitudinally therethrough, sized to accommodate their respective optical fibers 122 and 124 and optical fibers 126 and 128 with the desired spacing relative to each other. Alternatively, first ferrule 121 and second ferrule 127 may have two separate holes extending longitudinally therethrough and spaced a preselected distance from each other to receive respective optical fibers 122, 124, 126 and 128. This configuration greatly eases the assembly of the fibers into the ferrules 121, 127, and improves mechanical stability. The degradation of optical performance is negligible provided that the centers of the two holes in ferrules 121, 127 are separated a distance of 150 μm or less. The ferrules 121, 127 may be further enclosed in a holder 129, 129a respectively. Holders 129, 129a are attached to housing 150.

Ends 122a and 124a of optical fibers 122 and 124 are preferably disposed a selected distance from end 129b of holder 129. The portion of first ball lens 30 opposite from first support ring 131 may then be attached to end 129b of holder 129. The longitudinal axis of first ferrule 121 and holder 129 is generally aligned with the center of first ball lens 30 and the center of aperture 133. In one embodiment of the present invention, the outer diameter of ferrule 121 is smaller than the inner diameter of holder 129 by approximately 0.2 mm to 0.5 mm. This allows adjusting the alignment of optical fibers 122 and 124 relative to other optical components of OADM 120 to meet low-loss requirements in fiber-optics communications systems.

Ends 126a and 128a of optical fibers 126 and 128 are preferably disposed a selected distance from end 129c of holder 129a. The portion of second ball lens 32 opposite from optical filter 134 may be attached to end 129c of holder 129a using a layer of UV cured epoxy 138 and a layer of thermally cured epoxy 140, however other adhesives, bonding agents, or methods of attachment may be used to attach end 129c to holder 129a. The longitudinal axis of second ferrule 127 is generally aligned with the longitudinal axis of OADM 120. The focal plane after the ball lens is predetermined and the location for the filter can be determined using Oslo ray tracing software, geometric optics, or using the principles of symmetry.

First ferrule 121 with first full-ball lens 30, holder 129 and optical fiber 134 attached thereto are preferably disposed within housing 150. Housing 150 preferably has a generally cylindrical configuration with a longitudinal bore extending therethrough. The length of housing 150 is preferably selected to accommodate the length of first ferrule 121, second ferrule 127 and required spacing for first ball lens 30, second ball lens 32 and optical filter 134 for optimum optical performance of OADM 120. An adhesive material 152 may be used to bond or couple the exterior of first ferrule 121 with housing 129, and housing 129 with adjacent portions of the inside surface of housing 150. Adhesive layer 152 may be used to bond or couple the exterior of second ferrule 127 with housing 129a, and housing 129a with adjacent portions of the inside surface of housing 150.

Figure 8:
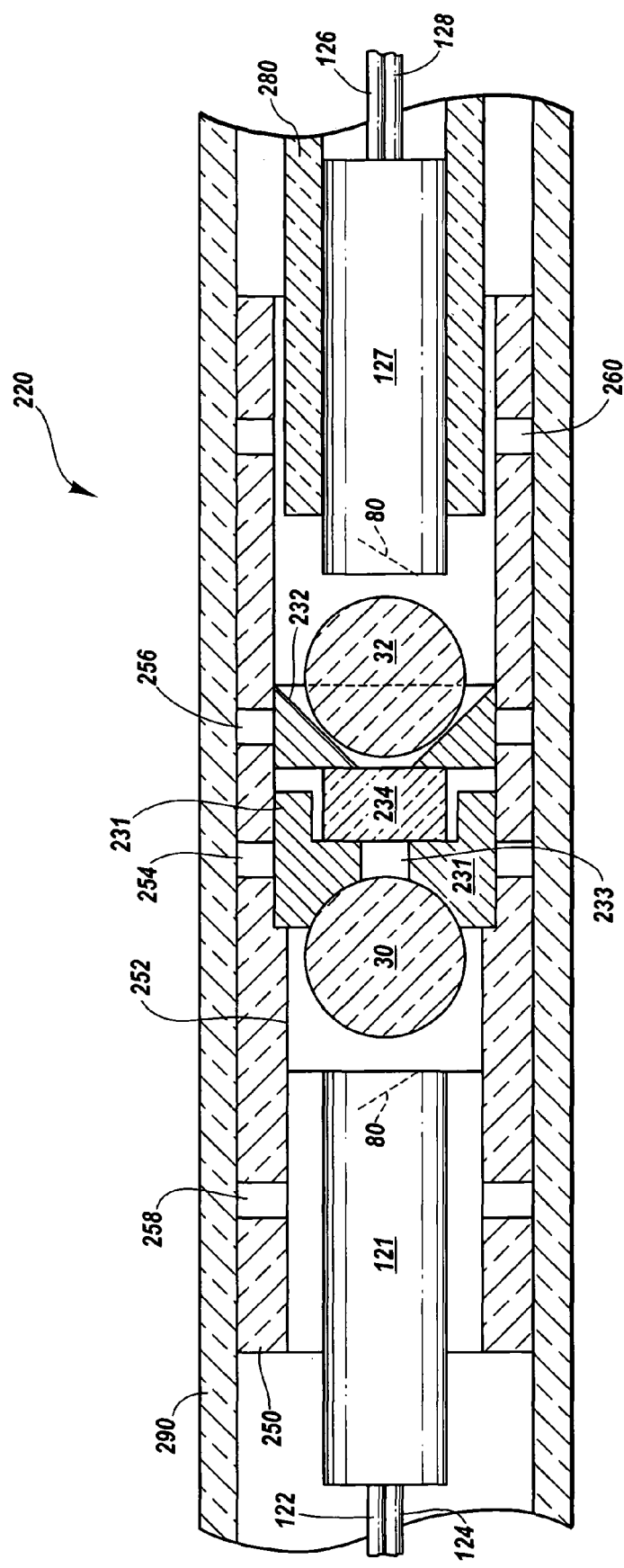
FIG. 8 is a sectional drawing of an OADM having a pair of full-ball lenses and a filter according to another alternate aspect of the present invention.

Another aspect of the present invention is shown in FIG. 8. OADM 220 may be formed with some of the same optical components as previously described with respect to OADM 20 and 120. Therefore, the discussion relating to other OADMs of the present invention also applies to the discussion related to OADM 220.

In this illustrative configuration, first full-ball lens 30 is attached to one side of a first support ring 231. First support ring 231 preferably includes aperture or opening 233 extending therethrough. Aperture or opening 233 may be configured to accommodate a relatively small aperture size in associated components. Optical filter 234 attaches to and is partially disposed within the opposite side of first support ring 231. Optical filter 234 may have a generally polygonal configuration which is compatible with a corresponding polygonal opening 233 formed in first support ring 231.

Alternately, optical filter 234 may be round, oval, or some other configuration having a diameter or dimension that is larger than opening 233. Optical filter 234 may be disposed at least partially within first support ring 231 and bonded or coupled therewith using adhesives, bonding agents, materials, mechanical components, or combinations thereof, as previously described with respect to OADM 120.

OADM 220 includes a second support ring 232. This second support ring 232 couples with optical filter 234 opposite from first support ring 231. Second full-ball lens 32 attaches to second support ring 232. For this embodiment of the present invention, first full-ball lens 30, first support ring 231, optical filter 234, second support ring 232, and second full-ball lens 32 may be assembled having desired spacing and optical alignment with respect to each other and may be considered as an optical assembly. This optical assembly may then be disposed within first housing 250.

First housing 250 has a generally cylindrical configuration with a longitudinal bore extending therethrough. First housing 250 includes a shoulder 252 formed on the interior of first housing 250 intermediate the ends thereof. The outside diameter of first support ring 231 is selected to engage shoulder 252. One or more ports 254 and 256 are preferably formed in the exterior of first housing 250 adjacent to and spaced from shoulder 252. When first full-ball lens 30, optical filter 234, second full-ball lens 32, and support rings 231 and 232 are disposed at their desired location within first housing 250, an appropriate adhesive or bonding compound may be injected through one or more ports 254 and 256 to securely fasten the optical assembly within first housing 250.

Although reference is made to use of adhesives or bonding compounds to securely attach the optical assembly to first housing 250, one skilled in the art will appreciate that mechanical components, whether alone or in combination with the adhesives or bonding compounds, may attach the optical assembly to first housing 250. Similarly, portions of the optical assembly, such as, but not limited to, support rings 231 and 232 may slip-fit or friction fit with first housing 250 and may be secured in place through such frictional contact alone or in combination with one or more of the other techniques described herein and otherwise known to one skilled in the art in light of the teaching contained herein.

First ferrule 121 with optical fibers 122 and 124 is inserted into one end of first housing 250 and adjusted to obtain the desired optical position relative to first full-ball lens 30 and optical filter 234. Housing 250 again has one or more ports 258 that facilitate bonding of first ferrule 121 in the optimum location. For some applications another ferrule (not expressly shown) may be disposed on the exterior of first ferrule 121 to provide additional assistance during the assembly of OADM 220. It will be understood that various techniques can be used to attach first ferrule 121 to housing 250 and/or to attach another ferrule to first ferrule 121.

A second ferrule 127 with optical fibers 126 and 128 attached therein may be installed through the opposite end of first housing 250. The position of second ferrule 127 and associated optical fibers 126 and 128 may be adjusted for optimum optical alignment relative to second full-ball lens 32. Again, one or more ports 260 provided in first housing 250 allow the injection of adhesive material to bond or couple second ferrule 127 with the adjacent inside diameter of first housing 250. For the embodiment of the present invention as shown in FIG. 8, another housing 280 may be disposed on the exterior of second ferrule 127 for ease of assembly. For some applications, an additional housing 290 may be disposed over the exterior of first housing 250.

If the end faces 122a, 124a, 126a and 128a are polished at an angle, the ferrules 121, 127 may be tilted to compensate for the bending of the light rays, so that the optical loss may be reduced to less than 0.6 dB at the output fiber 124. In this case, housing 280 may be eliminated. The inner diameter of housing 250 may then be at least 0.8 mm larger than the outer diameter of ferrules 121, 127 to allow enough space for ferrules 121,127 to tilt at the required angle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device comprising:
   a housing receiving a plurality of optical fibers adapted to carry optical signals;
   a filter disposed within said housing, said filter transmitting specific optical signals having a predetermined wavelength range;
   a first ball lens coupled to said housing and optically communicating with said filter, said first ball lens positioned relative to said filter and said plurality of optical fibers to collimate, focus and selectively route said optical signals;
   a spacer ring disposed between said first ball lens and a first side of said filter, said spacer ring fixing the relative position between said first ball lens and said filter; and
   a second ball lens coupled to said housing and optically communicating with said filter, said second ball lens positioned relative to said filter and said plurality of optical fibers to collimate, focus and selectively route said optical signals.

2. The optical device of claim 1, wherein said plurality of optical fibers comprises at least an input optical fiber, an output optical fiber, an add optical fiber, and a drop optical fiber.

3. The optical device of claim 1, wherein said ball lenses are fabricated from a material selected from a group consisting of glass, crystal, sapphire, semiconductor, and polymer.

4. The optical device of claim 1, wherein each of said ball lenses are substantially spherical and at least a part of a surface of each said ball lens is coated with an anti-reflective film.

5. The optical device of claim 1, wherein said filter is partially disposed within an aperture of said support ring.

6. The optical device of claim 1, further comprising a spacer ring disposed between said second ball lens and a second side of said filer, said spacer ring fixing the relative position between said second ball lens and said filter to predetermined values.

7. An optical device comprising;
   a housing receiving at least an input optical fiber, an output optical fiber, an add optical fiber, and a drop optical fiber;
   a wavelength selective filter disposed within said housing, said filter transmitting optical signals of a predetermined range of wavelengths and reflecting optical signals of other wavelengths;

a first full ball lens coupled to said housing and optically communicating with said filter, said first full ball lens positioned relative to said input fiber and said output fiber to simultaneously collimate light exiting from said input fiber and focusing light, incident upon a surface of said first full ball lens in close proximity to said filter, into said output fiber;

a first spacer ring disposed between said first ball lens and a first side of said filter for fixing the relative position between said first ball lens and said filter; and a second full ball lens coupled to said housing and optically communicating with said filter, said second ball lens positioned relative to said add fiber and said drop fiber to simultaneously collimate light exiting from said add fiber and focus light, incident upon a surface of said second full ball lens in close proximity to said filter, into said drop fiber.

8. The optical device of claim 7, wherein said input optical fiber and said output optical fiber are fixed within a first ferrule, said first ferrule being aligned and bonded to said housing so that said input optical fiber and said output optical fiber are maintained in a fixed position with respect to said first ball lens.

9. The optical device of claim 7, wherein said add optical fiber and said drop optical fiber are fixed within a second ferrule, said second ferrule being aligned and bonded to said housing so that said add optical fiber and said drop optical fiber are maintained in a fixed position with respect to said second ball lens.

10. The optical device of claim 7, wherein each of said fibers has an end face that is polished at a predetermined angle.

11. The optical device of claim 10, wherein each said end face is coated with an anti-reflective film.

12. The optical device of claim 7, wherein a part of a surface of each of said first ball lens and said second ball lens through which the light passes is coated with an anti-reflection film.

13. The optical device of claim 7, wherein said filter is at least partially disposed within an aperture defined by the first spacer ring.

14. The optical device of claim 13, further comprising a second spacer ring disposed between said second ball lens and a second side of said filter for fixing the relative position between said second ball lens and said filter.

15. The optical device of claim 7, wherein a diameter of each ball lens is determined based on a material from which the lens is formed.

16. The optical device of claim 7, wherein a diameter of each ball lens is determined based on a wavelength of the optical signal passing therethrough.

17. An optical device comprising:

a housing receiving at least one of an input optical fiber, an output optical fiber, an add optical fiber, and a drop optical fiber;

a first ball lens coupled to said housing, said first ball lens positioned relative to said input fiber and said output fiber to simultaneously collimate light exiting from said input fiber and focus said light into said output fiber;

a second ball lens coupled to said housing, said second ball lens positioned relative to said add fiber and said drop fiber to simultaneously collimate light exiting from said add fiber and focus light into said drop fiber;

a wavelength selective filter disposed between said first and second ball lenses, said filter transmitting light of a predetermined range of wavelengths and reflecting light of other wavelengths; and at least one support member disposed within the housing, wherein the first ball lens is attached to a first side of the at least one support member and the wavelength selective filter is attached to a second side of the at least one support member.

18. The optical device of claim 17, wherein a secondary housing at least partially surrounds said housing.

19. The optical device of claim 17, wherein said input optical fiber and said output optical fiber are disposed within a ferrule that is surrounded by said housing.

20. The optical device of claim 19, wherein said housing comprises a plurality of ports, said ports configured to receive an adhesive to securely retain said ferrule within said housing.

21. The optical device of claim 20, wherein at least one of said plurality of pons receives an adhesive to aid in securely retaining at least one of said first ball lens and said second ball lens.

22. The optical device of claim 21, wherein said wavelength selective filter is at least partially disposed within an aperture formed by said at least one support member.

23. The optical device of claim 22, wherein light propagates through said aperture formed in said at least one support member.

* * * * *

UNITED STATES PATENT AND TRADEMARK OFFICE
CERTIFICATE OF CORRECTION

PATENT NO. : 7,006,728 B1 Page 1 of 1
APPLICATION NO. : 10/602121
DATED : February 28, 2006
INVENTOR(S) : Jiang et al.

It is certified that error appears in the above-identified patent and that said Letters Patent is hereby corrected as shown below:

Column 8
Line 50, change "?1, and X4" to --$\lambda_3$, and $\lambda_4$--
Line 61, change "2" to --$\lambda_2$--

Column 14
Line 37, change "pons" to --ports--

Signed and Sealed this

Twenty-sixth Day of August, 2008

JON W. DUDAS
*Director of the United States Patent and Trademark Office*